(12) United States Patent
McCombs

(10) Patent No.: US 10,054,168 B2
(45) Date of Patent: Aug. 21, 2018

(54) CLUTCH ASSEMBLY COVER, METHOD OF MAKING SAME, AND OPTIONAL HEAT MANAGEMENT

(71) Applicant: Accel Performance Group LLC, Cleveland, OH (US)

(72) Inventor: Ross A. McCombs, Oskaloosa, IA (US)

(73) Assignee: Accel Performance Group LLC, Bowling Green, KY (US)

( * ) Notice: Subject to any disclaimer, the term of this patent is extended or adjusted under 35 U.S.C. 154(b) by 163 days.

(21) Appl. No.: 14/844,096

(22) Filed: Sep. 3, 2015

(65) Prior Publication Data

US 2015/0377304 A1    Dec. 31, 2015

Related U.S. Application Data

(62) Division of application No. 13/358,791, filed on Jan. 26, 2012.

(60) Provisional application No. 61/436,433, filed on Jan. 26, 2011.

(51) Int. Cl.
    *B21D 22/16*    (2006.01)
    *F16D 13/58*    (2006.01)
    *B21D 53/26*    (2006.01)

(52) U.S. Cl.
    CPC ............. *F16D 13/58* (2013.01); *B21D 22/16* (2013.01); *B21D 53/26* (2013.01); *F16D 2250/0023* (2013.01); *F16D 2300/0212* (2013.01)

(58) Field of Classification Search
    CPC ........ B21D 22/14; B21D 22/16; B21D 22/18; B21D 22/185; B21D 53/84; F16H 57/025; F02F 7/0073; F16D 25/0635; F16D 25/0638
    See application file for complete search history.

(56) References Cited

U.S. PATENT DOCUMENTS

| 157,272 A | 12/1874 | Conger |
| 603,094 A | 4/1898 | Worth |
| 1,011,000 A | 12/1911 | Worth et al. |
| 1,749,917 A | 3/1930 | Meadowcroft |

(Continued)

FOREIGN PATENT DOCUMENTS

| DE | 202015009048 | 9/2016 |
| WO | 2015066500 | 7/2015 |

OTHER PUBLICATIONS

Transmittal Letter of Related Cases.

(Continued)

*Primary Examiner* — Edward Tolan
(74) *Attorney, Agent, or Firm* — Middleton Reutlinger

(57) ABSTRACT

A clutch cover for use with virtually any combination of make and model of engine components and method of making the same is disclosed. The clutch cover is made by spin forming a sheet of metal and removing material as needed to coincide with the corresponding engine components. Therefore, the exact design of the cover including attaching holes and apertures related to release levers may be quickly and easily formed in the clutch cover. Furthermore, a heat management system is provided that includes the addition of fins or other apertures through the clutch cover to increase the air flow to reduce the temperature within the clutch cover to cool engine components.

21 Claims, 6 Drawing Sheets

(56) References Cited

U.S. PATENT DOCUMENTS

| | | |
|---|---|---|
| 1,824,440 A | 9/1931 | Meyer |
| 2,062,102 A | 12/1932 | Nutt et al. |
| 2,060,773 A | 1/1933 | Pearmain |
| 1,899,274 A | 2/1933 | Hook et al. |
| 1,939,356 A | 12/1933 | Lindgren |
| 2,091,409 A | 8/1937 | Lewis |
| 2,107,954 A | 2/1938 | Morton et al. |
| 2,126,149 A | 8/1938 | Spase |
| 2,674,216 A | 4/1954 | Griffin |
| 2,746,163 A | 5/1956 | Mortiz |
| 2,752,675 A | 7/1956 | Bauer |
| 2,825,129 A | 3/1958 | Hempel |
| 2,932,890 A | 4/1960 | Sporck et al. |
| 2,982,150 A | 5/1961 | Kolbe |
| 3,027,960 A | 4/1962 | Ditel |
| 3,072,086 A | 1/1963 | Birchfield et al. |
| 3,075,691 A | 1/1963 | Kelley |
| 3,090,475 A | 5/1963 | Gatewood et al. |
| 3,104,640 A | 9/1963 | Sporck et al. |
| 3,114,342 A | 12/1963 | Sporck et al. |
| 3,187,534 A * | 6/1965 | Kalpakcioglu ........ B21D 22/16 72/83 |
| 3,205,688 A | 9/1965 | Paulton |
| 3,222,765 A | 12/1965 | Parent et al. |
| 3,316,745 A | 5/1967 | Berghahn et al. |
| 3,342,051 A * | 9/1967 | Leszak ................. B21D 22/185 72/57 |
| 3,355,920 A | 12/1967 | Ellenburg |
| 3,391,439 A * | 7/1968 | Bulgrin .................. B21D 53/26 29/894.325 |
| 3,603,435 A | 9/1971 | Buzzard |
| 3,667,581 A | 6/1972 | Hanks |
| 3,696,689 A * | 10/1972 | Senter ................... F16H 57/025 180/271 |
| 3,772,938 A * | 11/1973 | Johnson ................ F02F 7/0073 123/195 A |
| 3,809,192 A | 5/1974 | Stehle |
| 3,841,290 A | 10/1974 | Shubeck |
| 4,016,642 A | 4/1977 | Kraft et al. |
| 4,041,746 A | 8/1977 | Kraft |
| 4,050,321 A | 9/1977 | Kraft |
| 4,055,976 A | 11/1977 | Kraft |
| 4,056,291 A | 11/1977 | Kraft et al. |
| 4,109,542 A | 8/1978 | Kraft |
| 4,254,541 A | 3/1981 | St. John |
| 4,289,008 A | 9/1981 | Steele |
| 4,294,343 A | 10/1981 | Reh |
| 4,478,593 A | 10/1984 | Brown |
| 4,528,734 A | 7/1985 | Beyer |
| 4,579,604 A | 4/1986 | Beyer |
| 4,580,673 A | 4/1986 | Graton |
| 4,599,769 A | 7/1986 | Latzko et al. |
| 4,606,206 A | 8/1986 | Daudi |
| 4,641,547 A | 2/1987 | Stich et al. |
| 4,674,616 A | 6/1987 | Mannino, Jr. |
| 4,747,284 A | 5/1988 | Hudson |
| 4,848,080 A | 7/1989 | Hoffmann et al. |
| 4,936,129 A | 6/1990 | Lipper et al. |
| 4,955,343 A | 9/1990 | Ogami |
| 4,989,657 A | 2/1991 | Lipper |
| 5,094,331 A | 3/1992 | Fujimoto et al. |
| 5,150,777 A | 9/1992 | Friedmann |
| 5,203,441 A | 4/1993 | Monette |
| 5,218,849 A | 6/1993 | Sieger et al. |
| 5,226,516 A | 7/1993 | Novikoff et al. |
| 5,267,488 A | 12/1993 | Hardeman et al. |
| 5,279,182 A | 1/1994 | Fukushima |
| 5,351,796 A | 10/1994 | Uenohara |
| 5,384,949 A | 1/1995 | Wodrich et al. |
| 5,404,979 A | 4/1995 | Craft et al. |
| 5,426,964 A | 6/1995 | Sieger |
| 5,473,808 A | 12/1995 | Winters, Sr. |
| 5,531,088 A | 7/1996 | Inatani |
| 5,566,591 A | 10/1996 | Burkett |
| 5,575,367 A | 11/1996 | Romanelli |
| 5,619,879 A | 4/1997 | Friese |
| 5,634,271 A | 6/1997 | Lipper |
| 5,758,532 A | 6/1998 | Massee |
| 5,775,151 A | 7/1998 | Massee |
| 5,782,324 A | 7/1998 | Wall |
| 5,836,431 A | 11/1998 | Jackel |
| 5,845,757 A | 12/1998 | Csonka |
| 5,857,547 A | 1/1999 | Dequesnes |
| 5,896,971 A | 4/1999 | Hein |
| 5,992,597 A * | 11/1999 | Nagai ................... B21D 22/16 192/109 F |
| 6,042,935 A | 3/2000 | Krenkel et al. |
| 6,056,099 A | 5/2000 | Jacket et al. |
| 6,065,578 A | 5/2000 | Nakatani et al. |
| 6,189,357 B1 | 2/2001 | Baumgarten et al. |
| 6,199,419 B1 | 3/2001 | Shrayer et al. |
| 6,561,002 B2 | 5/2003 | Okada et al. |
| 6,568,518 B2 | 5/2003 | Sarar |
| 6,601,284 B1 | 8/2003 | Wall |
| 6,694,791 B1 * | 2/2004 | Johnson ................. B21D 22/16 72/115 |
| 6,701,617 B2 | 3/2004 | Li et al. |
| 6,705,263 B2 | 3/2004 | Ito et al. |
| 6,731,043 B2 | 5/2004 | Pritchard et al. |
| 6,823,705 B2 | 11/2004 | Fukuda et al. |
| 7,091,635 B1 | 8/2006 | Gilliland et al. |
| 7,097,006 B2 | 8/2006 | Veneziano |
| 7,097,007 B2 | 8/2006 | Lin |
| 7,124,609 B1 | 10/2006 | Hermanson |
| 7,152,446 B2 | 12/2006 | Wada et al. |
| 7,228,629 B2 | 6/2007 | Beyer |
| 7,243,517 B2 | 7/2007 | Sieger |
| 7,798,301 B2 | 9/2010 | Keating et al. |
| 8,146,719 B2 | 4/2012 | Antanaitis et al. |
| 8,561,283 B1 | 10/2013 | McCombs et al. |
| 8,852,752 B2 * | 10/2014 | Cripsey ................. B21D 22/16 192/69 |
| D726,531 S | 4/2015 | Muzic |
| 9,360,100 B2 | 6/2016 | McCombs et al. |
| D760,582 S | 7/2016 | Muzic |
| 9,482,308 B2 | 11/2016 | McCombs |
| 9,518,645 B2 | 12/2016 | McCombs |
| 9,739,343 B2 | 8/2017 | McCombs |
| 2003/0005792 A1 | 1/2003 | Ninomiya et al. |
| 2003/0015058 A1 | 1/2003 | Bell |
| 2003/0145676 A1 | 8/2003 | Bennefous et al. |
| 2004/0040802 A1 | 3/2004 | Veneziano et al. |
| 2005/0010328 A1 | 1/2005 | Ikeda et al. |
| 2006/0090591 A1 | 5/2006 | Graeve |
| 2006/0231369 A1 | 10/2006 | Bassett et al. |
| 2006/0272378 A1 * | 12/2006 | Amino ................. B21D 22/185 72/305 |
| 2007/0039366 A1 | 2/2007 | Michel et al. |
| 2008/0179870 A1 | 7/2008 | Theodore |
| 2009/0301153 A1 | 12/2009 | Tachi |
| 2010/0116603 A1 | 5/2010 | Kitchell |
| 2012/0186386 A1 | 7/2012 | McCombs |
| 2012/0186935 A1 | 7/2012 | McCombs |
| 2012/0186936 A1 | 7/2012 | McCombs |
| 2014/0020505 A1 | 1/2014 | McCombs et al. |
| 2015/0122066 A1 | 5/2015 | McCombs |
| 2015/0300420 A1 | 10/2015 | Kirchhoffer |
| 2016/0069416 A1 | 3/2016 | Kowalski |
| 2016/0281835 A1 | 9/2016 | McCombs et al. |
| 2017/0045115 A1 | 2/2017 | McCombs |
| 2017/0234402 A1 | 8/2017 | McCombs |

OTHER PUBLICATIONS

Quicktime Inc. Product Listing Dec. 1, 2005 [online] www.quicktimeinc.com/products.html [retrieved on May 10, 2011], Retrieved from Internet Archive http://replay.web.archive.org.

SFI Foundation Inc., "Specification List", www.sfifoundation.com/speclist.html. Printout from Internet Oct. 26, 2007.

Speedway Motors, Explosion-Proof Chevy Bellhousing With Plate; www.speedwaymotors.com/p/545,37, Printout from Internet Oct. 25, 2007.

(56) References Cited

OTHER PUBLICATIONS

Definition of "Bell housing", wikipedia page printout from Internet Oct. 28, 2007.
"List of Chrysler bellhousing patterns", wikipedia page printout from Internet Oct. 28, 2007.
Definition of "Hydroforming", wikipedia page printout from Internet Oct. 28, 2007.
Definition of "Metal spinning", wikipedia page printout from Internet Oct. 28, 2007.
Engineers Edge, "Metal Spinning", diagram illustrating "outside" type metal spinning, page printout from Internet Oct. 28, 2007.
Globalspec, "About Metal Spinning Services" examples of metal spinning, page printout from Internet Oct. 28, 2007.
Utility U.S. Appl. No. 15/495,492 entitled Bellhousing Alignment Device and Method, filed Apr. 24, 2017.
Belway B.P. et al. (2006). ASM Handbook, vol. 14B—Metalworking: Sheet Forming . . . ASM International. pp. 367-374.
Tremec Corporation T-56; Tremec Transmissions 2012 Performance Product Guide Mar. 24, 2015. Retrieved from www.archive.org Nov. 2, 2017.

* cited by examiner

CLUTCH ASSEMBLY COVER, METHOD OF MAKING SAME, AND OPTIONAL HEAT MANAGEMENT

CROSS-REFERENCE TO RELATED APPLICATION

This application is a divisional application of patent application Ser. No. 13/358,791, filed Jan. 26, 2012, which claims priority to provisional application 61/436,433 filed on Jan. 26, 2011. All of the above applications are incorporated by reference in their entirety as if fully recited herein.

TECHNICAL FIELD

The present invention is generally related to a clutch assembly. More particularly, but not exclusively, the invention relates to an improved clutch assembly cover and a method of making the cover, as well as an optional heat management feature that can be included with the cover.

BACKGROUND OF THE INVENTION

As is well known, clutches for vehicles operate to selectively couple and decouple an engine to a transmission for the purpose of starting the vehicle movement while the engine is in gear, bringing the vehicle to a stop while the engine is running, changing gears while the vehicle is in motion and putting the vehicle in motion from a dead stop. Conventional clutches include a cover assembly having an annular cover or housing and an annular pressure plate connected to the cover for conjoint rotation with the cover. The cover is fixedly attached to a flywheel driven by the vehicle engine, so that the pressure plate is located between the cover and the flywheel. Attachment of the cover to the flywheel is by a plurality of bolts, which space the cover and pressure plate from the flywheel.

A drive shaft is received through the cover assembly and flywheel free of fixed connection to any of these so that absent action of the clutch, the drive shaft and flywheel rotate independently of each other. The drive shaft is splined and one or more clutch friction discs are mounted on the splines for conjoint rotation with the drive shaft, while being free to slide longitudinally on the drive shaft. The clutch friction discs are positioned between the pressure plate and the flywheel. Heat shields are disposed between the pressure plate and nearest friction disc, and also between the flywheel and nearest friction disc. Floater plates are disposed between adjacent friction discs.

Springs between the cover and pressure plate force a ring away from the cover to clamp the friction discs against the flywheel. The clamping action mates the drive shaft and flywheel for conjoint rotation so that the drive shaft is driven by the engine. However, some relative rotation or sliding between the friction discs and flywheel desirably occurs before there is conjoint rotation to reduce the impact loads on the engine and drive shaft as well as to make the motion of the vehicle smoother.

The clutch is released to permit independent rotation of the flywheel and drive shaft by a mechanical linkage. Levers pivotally mounted on the cover are connected to pins fixedly attached to the pressure plate. The levers may be engaged by a release member of the mechanical linkage to pull the pressure plate toward the cover against the force of the springs to release the clutch.

The cover protects the clutch and flywheel from being obstructed by foreign elements. The cover also provides a barrier to access within the clutch assembly to prevent accidental contact with the fast-spinning parts within the clutch assembly. A typical clutch cover is stamped or cast metal. The shapes can vary depending on a number of factors including type and manufacturer of clutch.

However, casting and stamping requires the use of an expensive mold, and a new mold is required for each type or style of cover. One type or style of cast or stamped cover only fits one type or brand of motor or car, and is not transferrable between different automobiles or engines. Multiple molds increase costs greatly. In addition, special strengthening methods must be incorporated, such as having a greater thickness of metal, more metal material, special structural features, or the like. The strengthening is due to casting or stamping and the stresses experienced by the cover. The strengthening methods can add weight, increase the size, and otherwise be antagonistic to efficiency and economy of manufacturing the cover, use of space on the automobile, and operation of the automobile.

It is therefore a primary object, feature, and/or advantage of the present invention to provide an apparatus and method that improves over the deficiencies in the art.

It is another object, feature, and/or advantage of the present invention to provide an improved clutch cover and method of making the same that is lighter in weight than prior art clutch covers.

It is another object, feature, and/or advantage of the present invention to provide an improved clutch cover and method of making the same that has a smaller profile from the plane of a mounting flange to the plane at the opposite side of the cover.

It is another object, feature, and/or advantage of the present invention to provide an improved clutch cover and method of making the same that occupies less space to be able to fit more clutch lining layers on the clutch disc to better handle higher horsepower engines.

It is another object, feature, and/or advantage of the present invention to provide an improved clutch cover and method of making the same that is less expensive than a die cast stamp, mold, or form.

It is another object, feature, and/or advantage of the present invention to provide an improved clutch cover and method of making the same that includes an optional heat management feature that can deter damage or deterioration of the clutch plates due to increased heat.

These and/or other objects, features, and advantages of the present invention will be apparent to those skilled in the art. The present invention is not to be limited to or by these objects, features and advantages. No single embodiment need provide each and every object, feature, or advantage.

SUMMARY OF THE INVENTION

According to one aspect of the present invention, a clutch cover for connecting a clutch assembly to a flywheel of an engine is provided. The clutch cover includes a bowl shaped member having an axis, a wide end, a narrow end, and an aperture through the narrow end along the axis. The bowl-shaped member is formed by deforming a spinning sheet of metal. A flange extends about the wide end of the bowl-shaped member. A rim is formed at the narrow end of the bowl-shaped member adjacent the aperture. A pattern of holes is machined in the flange and the rim, with the pattern of holes determined by the type of engine used. A plurality of apertures is formed through the bowl-shaped member and is configured to house release levers of a pressure plate assembly.

According to another aspect of the present invention, a method of forming a universal clutch cover for use with a clutch assembly used with virtually any make of vehicle engine is provided. The method includes determining the make of the vehicle engine. A force is applied normal to a spinning sheet of metal having an aperture therethrough to form a generally bowl-shaped member with a flange at a wide end and a rim at a narrow end of the bowl-shaped member. A pattern of holes is machined in the flange of the bowl-shaped member, with the pattern of holes corresponding to the make of the vehicle engine. A plurality of apertures is machined through the bowl-shaped member between the flange and the rim.

According to yet another aspect of the present invention, a method of forming a clutch cover for a clutch assembly of an engine is provided. The method includes forming a hole in a sheet of metal. The sheet of metal is spun on a spin-casting machine about the central axis of the hole. A force is applied normal to the sheet of metal starting at a predetermined distance from the edge of the hole to form a bowl-shaped member having a rim adjacent a narrow end and a flange adjacent a wide end, with the rim and flange being generally perpendicular to the axis of the hole. A pattern of flange holes is machined in the flange, wherein the pattern of flange holes are configured to operably attach the clutch assembly to the engine. A plurality of apertures is cut in the bowl-shaped member, the apertures adapted to house release levers.

BRIEF DESCRIPTION OF THE DRAWINGS

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
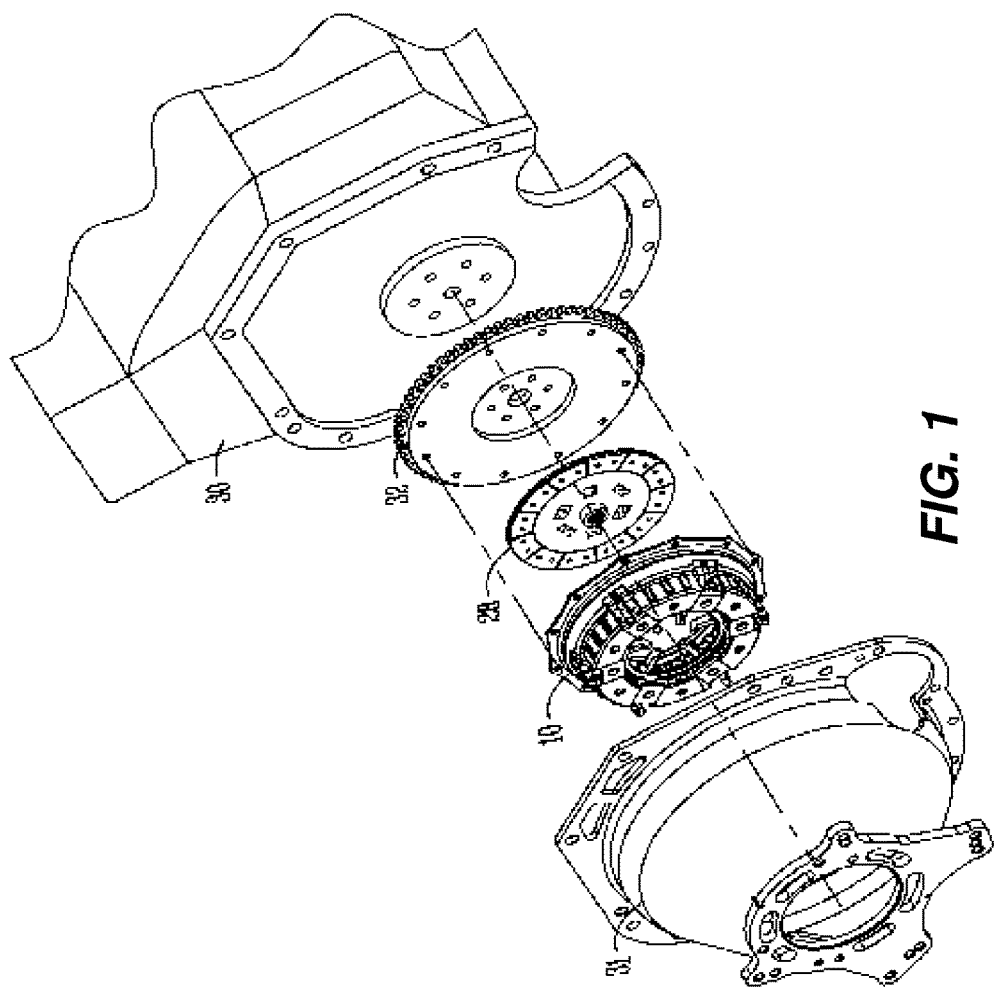
FIG. 1 is an exploded view of components of a vehicle engine, including an engine block, flywheel, clutch assembly, and bell housing.

FIG. 1 is an exploded view of components of a vehicle engine, including an engine block 30, a flywheel 32, a clutch disc 28, a clutch assembly 10, and a bell housing 31. The flywheel 32 is connected to the engine 30 and the clutch assembly 10 is connected to the flywheel 32 with the clutch disc 28 therebetween. As is known in the art, the clutch assembly 10 works with the clutch disc 28 to selectively press the clutch disc 28 against the flywheel 32 in order to power a vehicle. Furthermore, the flywheel 32, clutch disc 28 and clutch assembly 10 are confined within the bell housing 31, which is attached to the engine 30. Therefore, it should be understood that the clutch assembly 10 ideally has a low height in order to take up the least amount of room within the bell housing 31 and to keep the engine 30 from getting too large.

Figure 2:
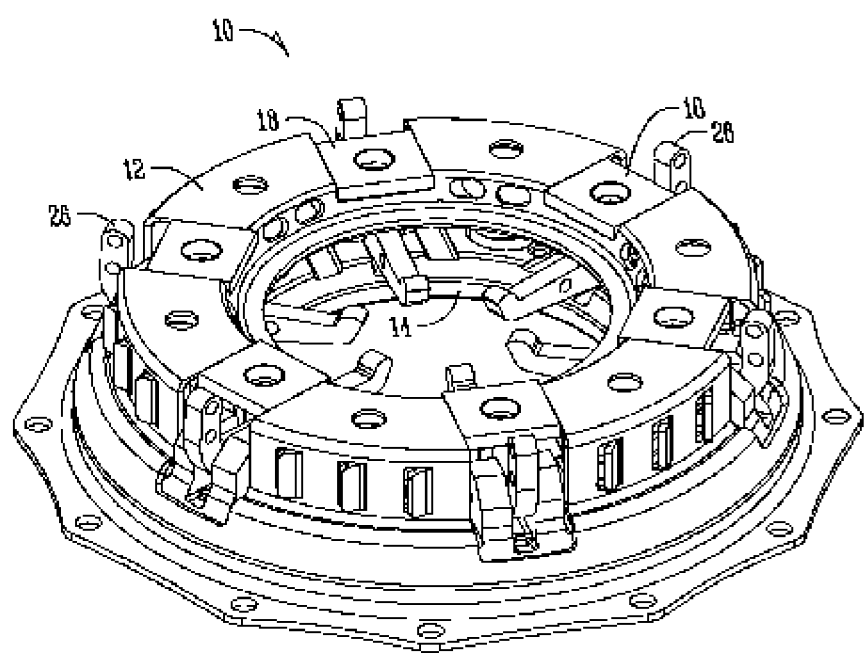
FIG. 2 is a perspective view of a clutch assembly used in vehicles.

FIG. 2 is a perspective view of a clutch assembly 10 as taken from FIG. 1 and used in vehicles. As stated above, the clutch assembly 10 is used to selectively engage a clutch disc 28 with a flywheel 32 in an engine to both allow the automobile vehicle to idle without having to power down, and to provide power to the wheels of the vehicle in order to drive said vehicle. Previously, the clutch assembly 10 has been engine specific. For example, a certain clutch assembly 10 must be used with a certain engine 30, e.g., a Chevrolet manufactured engine requires the use of a Chevrolet clutch assembly. The clutch requirements make it difficult for automobile enthusiasts to interchange engine components as they may like. As shown in FIG. 2, the clutch assembly 10 includes at least a clutch cover 12 and a pressure plate assembly 14 attached to the clutch cover 12.

Figure 3:
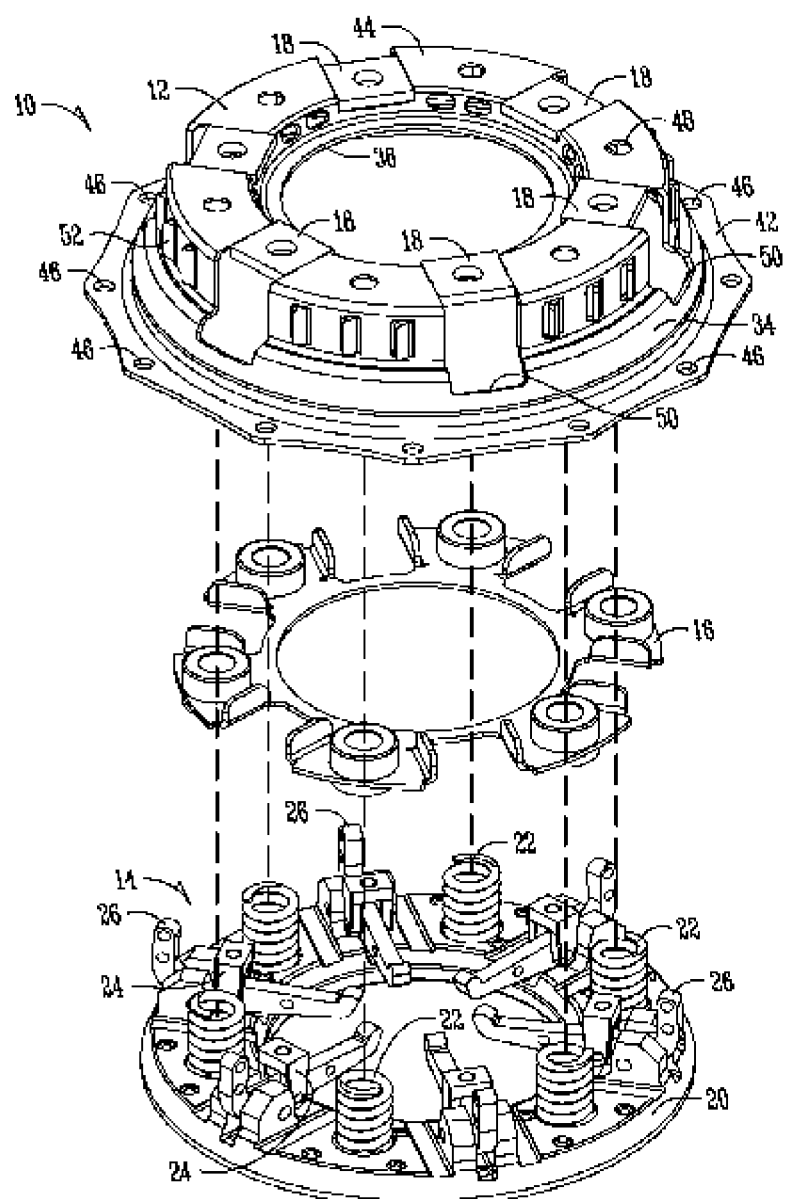
FIG. 3 is an exploded view of the clutch assembly of FIG. 2.

FIG. 3 shows an exploded view of the clutch assembly 10 of FIG. 2. The clutch assembly 10 includes a clutch cover 12, a pressure plate assembly 14, a spring retainer 16, and a plurality of blocks 18 or other means of attaching the clutch cover 12 to the pressure plate assembly 14.

The pressure plate assembly 14 generally includes a pressure plate 20, a plurality of springs 22 positioned radially on the pressure plate 20, as well as a plurality of pivots 24 and release levers or arms 26 positioned radially on the pressure plate 20. The springs and release arms are configured to selectively engage the clutch disc 28 into contact and from contact with the flywheel 32 via the pressure plate 20. Therefore, the number and arrangement of springs and release arms may vary depending on the type of vehicle. For instance, racing vehicles or vehicles having a higher torque and horsepower may require more release arms than would a standard vehicle used on public roads. Therefore, the present invention contemplates that the number of release arms may vary as is known and used in the industry. However, it is noted that most vehicles will use between three and ten release arms.

Positioned between the pressure plate assembly 14 and the clutch cover 12 is a spring retainer 16. The spring retainer 16 helps align the springs 22 of the pressure plate assembly 14 and prevents the springs from being diverted from their line of axis. The spring retainer 16 is housed within the clutch cover 12. Also shown in FIG. 3 is a plurality of blocks 18 operatively attached to the clutch cover 12. The blocks 18 align with the pivots 24 of the pressure plate assembly 14 to attach the clutch cover 12 to the pressure plate assembly 14. Therefore, the number of blocks 18 will correspond to the number of release arms 26 used with the vehicle.

Figure 4:
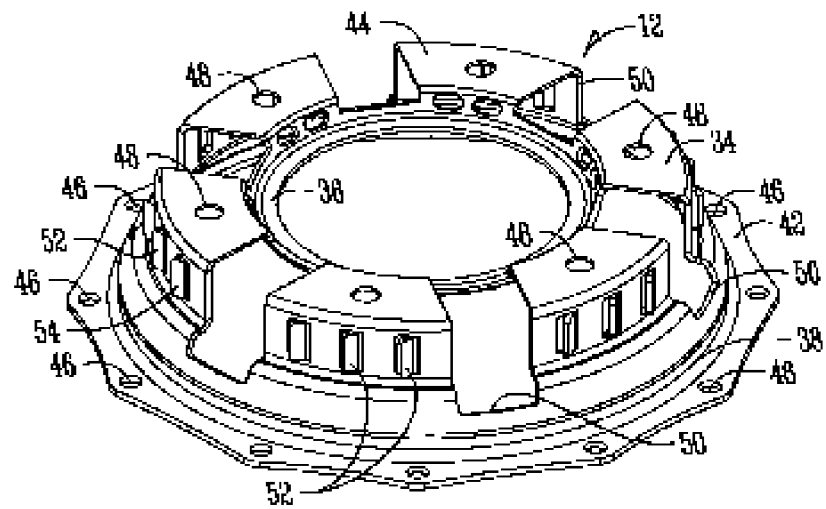
FIG. 4 is a perspective view of a clutch cover according to the present invention.

FIG. 4 is a perspective view of a clutch cover 12 according to the present invention. It should be noted that the clutch cover 12 may also be known as a clutch housing or clutch hat. The clutch cover 12 includes a generally bowl-shaped member 34 having a wide end 38 and a narrow end 40. Adjacent the wide end 38 and extending therefrom is a flange 42. Adjacent the narrow ends 40 and extending generally inwardly towards an axis 62 of the bowl-shaped member 34 is a rim 44. On the flange is a pattern of flange holes 46 that correspond to the flywheel 32 of an engine. On the rim 44 is a pattern of rim holes 48 that corresponds with the bell housing 31 for attaching the clutch assembly 10 to the bell housing 31. Therefore, the flange holes 46 and rim holes 48 will be make or model specific, and will be determined by the make and model of the engine that the clutch assembly 10 will be used with. Furthermore, the clutch cover 12 includes a plurality of lever arm apertures 50 through the bowl-shaped member 34 and partially through the rim. The lever arm apertures 50 correspond to the lever or release arms 26 of the pressure plate assembly 14. Therefore, the number of lever arm apertures 50 will depend on the number of release levers or arms 26 used with the clutch assembly 10. Further shown in FIG. 4 is a plurality of bent segments or fins 52 positioned radially about the clutch cover 12. The fins 52 are bent segments 54 of the bowl-shaped member 34, and are used to provide a heat management aspect of the invention, as will be described in greater detail below.

Figure 5:
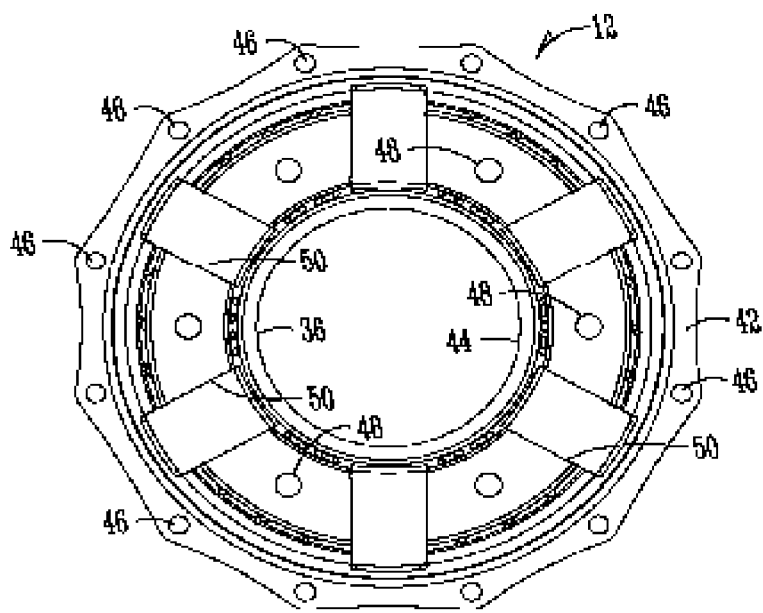
FIG. 5 is a bottom view of the clutch cover of FIG. 4.
Figure 6:
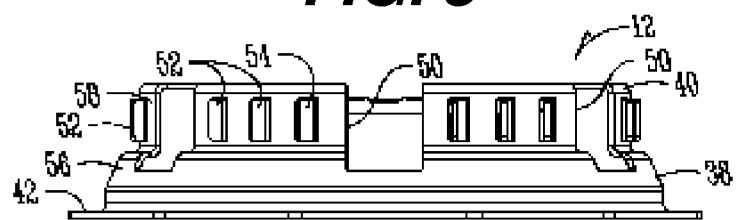
FIG. 6 is a side view of the clutch cover of FIG. 4.

FIGS. 5 and 6 are a bottom view and side view of the clutch cover 12 of FIG. 4. The clutch cover 12 of the present invention is spun cast. The spin casting of the clutch cover 12 allows the clutch cover 12 to be manufactured quicker and cheaper than existing methods. Furthermore, the spin casting allows the clutch cover 12 to be generally a universal-type clutch cover that can be used with any make or model of engine, flywheel, 15 and bell housing. FIGS. 5 and 6 show a few more of the details of the clutch cover 12. For instance, it should be noted that the rim 44 and flange 42 are generally planar and parallel to one another. This allows the clutch cover 12 to be easily mounted in an engine. Furthermore, it should also be noted that the clutch cover 12 includes a generally first section 56 at the wide end 38 of the clutch cover 12 and a second section 58 at the narrow end 40 of the clutch cover 12. The second section 58 of the clutch cover 12 is generally perpendicular to the flange 42 and rim 44 of the clutch cover 12. The height of the second section 58 may also be varied according to the specific type of vehicle and engine. It should be noted that spin coating produces a clutch cover with greater strength, and that the spin cast cover can be lower in height due to the greater strength.

Figure 7A:
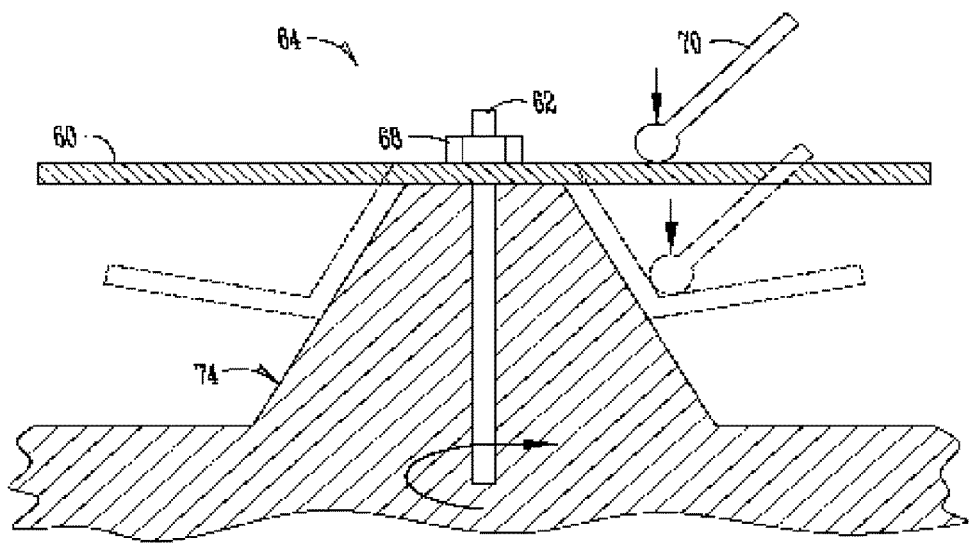
FIG. 7A shows a method of forming the clutch cover by use of an internal spin forming machine.
Figure 7B:
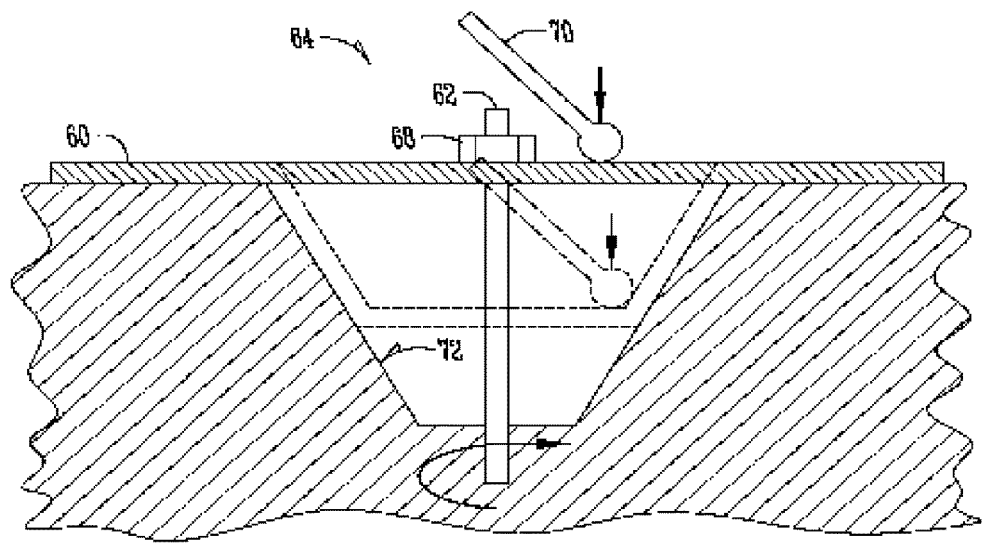
FIG. 7B shows a method of forming the clutch cover by use of an external spin forming machine.

FIGS. 7A and 7B show alternative methods of spin forming a sheet of steel or metal 60 into the bowl-shaped member 34 for use as a clutch cover 12. FIG. 7A shows the use of an external-type spin forming and FIG. 7B shows the use of an internal-type spin forming.

FIG. 7A shows the method of forming the clutch cover 12 by use of an external spin forming machine 64. A sheet of metal 60 with a hole or aperture 36 therethrough placed onto a spinning machine 64 with the axis of the sheet of metal passing through the axis 62 of the spinning machine 64 itself. The sheet 60 is then secured by a support 68 and spun at a very high speed. As the sheet 60 spins, a roller 70 exerts a force downward onto the sheet 60 forcing it to form about a mandrel 74 with a flange 42 formed at the wide end of the bowl-shaped member 34. However, as shown in FIG. 7A according to the dashed lines, as the roller 70 exerts a force normal to the sheet 60 of the mandrel 74, the flange 42 may not be level or parallel with the rim 44. Therefore, this method may require the use of a leveling machine or other method for leveling the flange 42 to the rim 44.

FIG. 7B shows an internal-type spin forming. A sheet of metal 60 is placed onto the spinning machine 64 with the axis 62 of the spinning machine 64 inserted through an aperture 36 in the center of the sheet of metal 60. The sheet 60 is then secured to the spinning machine 64 by the use of a support 68. The spinning machine 64 then spins the sheet 60 at a high speed, and a roller 70 exerts a force generally normal to the sheet 60. The force exerted by the roller 70 causes the sheet to form into the cavity 72. Therefore, the shape of the spun sheet of metal will coincide to the shape of the cavity 72 of the spinning machine 64. Furthermore, the cavity 72 and the initial position of the roller 70 may be determined such that a flange 42 is left at the wide end of the spun sheet of metal 60 as is required for the clutch cover 12. Once the sheet 60 has been spun to form the bowl-shaped member 34, the flange 42 may be leveled as needed to make it parallel to the rim 44 of the clutch cover 12.

Figure 8:
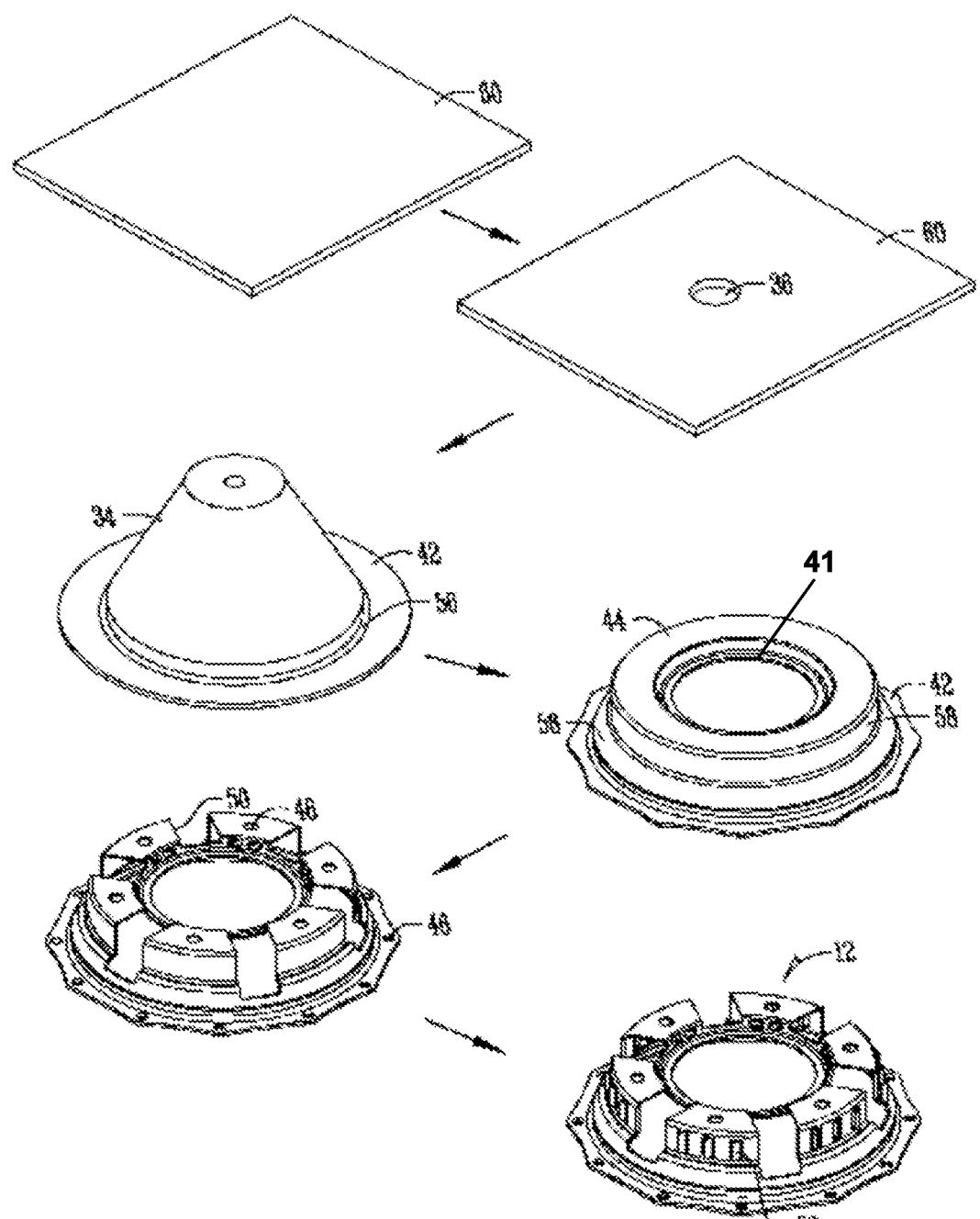
FIG. 8 shows the steps of a process of forming the clutch cover according to the present invention.

FIG. 8 shows a series of steps of a process of forming the clutch cover 12 according to the present invention. The clutch cover 12 starts with a single sheet 60 of metal, such as steel. Next, an aperture 36 is formed in the center of the sheet 60, with the aperture serving as an indexing hole to be placed on the spin casting machine. Therefore, for the present invention, it is preferred that the aperture 36 be formed in the center of the 25 sheet of metal 60. The sheet 60 is then spun cast on a spinning machine 64 as disclosed according to one of the methods as disclosed in either FIG. 7A or 7B. Thus, the bowl-shaped member 34 may be formed by either external or internal spin casting. After this step, the bowl-shaped member 34 will have a flange 42 and the beginnings of a rim 44. It should be noted that the spinning may form a general bowl-shaped member 34 as shown in FIG. 8 or may use a spin cast machine having the shape of the clutch cover 12 as shown in the next step. Therefore, the beginnings of the clutch cover 12 shape may be formed.

In the fourth step shown in FIG. 8, the bowl-shaped member 34 is formed to have a flange 42, a rim 44, and the bowl-shaped body therebetween. A force may be applied near the rim 44 to form a recessed ridge 41. The bowl-shaped body includes a first section 56 at the wide end of the bowl-shaped member 34 and a second section 58 adjacent the narrow portion of the bowl-shaped member 34. As described above, the second section 58 of the bowl-shaped member 34 may be generally perpendicular to the rim and flange of the member. Furthermore, as shown in this step, the flange has been machined or laser cut to have a specific peripheral shape. The peripheral shape is determined by the make and model of the engine. Next, material is removed from the bowl-shaped member 34. For instance, a pattern of flange holes 46 and rim holes 48 are machined into the member. The flange holes 46 and rim holes 48 are selected depending on the make and model of the engine in which the clutch cover 12 will be used. Additionally, a plurality of lever arm apertures 50 are formed in the bowl-shaped member 34. The number and location of the lever arm apertures 50 will depend on the pressure plate assembly 14 used with the clutch cover 12. This may also depend on the intended use of the clutch assembly 10. Finally, a plurality of fins 52 may be stamped in the bowl shaped member 34 or clutch cover 12 body. The fins 52 are bent segments of the clutch cover 12 body. The fins 52 may be stamped by a stamping machine. However, it should be noted that the fins 52 are bent segments 54 comprising the material of the clutch cover 12 bent at least partially away from the axis of the clutch cover 12 such that there is a slight opening from the outside of the clutch cover 12 to the inside of the clutch cover 12. The fins 52 provide a heat management system for the clutch assembly 10.

As stated above, the method of manufacturing the clutch cover 12 of the present invention provides for many benefits over the prior art. By spin casting the clutch cover 12, the exact design of the clutch cover 12 may be varied on a case by case basis. For instance, many automobile enthusiasts would like to use different engine components than what is provided by the manufacturer of the vehicle. This might be known as after-market parts. Therefore, enthusiasts may wish to use a Chevrolet engine with a Ford transmission. Presently, there is difficulty in connecting the different types of engines and transmissions. This is due to the fact that each manufacturer has certain attaching features that do not coincide with another manufacturer. Therefore, in order to connect the two, specialty components such as bell housings and clutch covers are needed. However, due to the price of molds that are presently used to manufacture the clutch covers, this is not economically feasible. Therefore, the spin casting and machining of the clutch cover 12 according to the present invention allows for this to become a reality.

The spin forming also adds strength to the clutch cover 12 compared to hydroforming the cover. The added strength allows the cover to be thinner, which also means lighter. Furthermore, the lower clearance allows for the clutch assembly 10 to use more clutch discs than previously, which aids in the engine efficiency.

The method of manufacturing the clutch cover 12 as described above would allow for a mere universal combination of engine components. For instance, a customer may wish to include two different makes of engine and transmission. Once the make and model of engine and transmission are known, the present invention will allow for a quick and inexpensive way to provide for a clutch cover for use with the different makes and models of transmission and engine. Furthermore, the invention contemplates the use of a database that includes specifications for different types of engines, bell housings, transmissions, and other engine components related to the clutch assembly 10. Therefore, a user would simply select the desired engine components from said database, and the clutch cover 12 would be manufactured to accommodate the selected engine components. This may include the pattern of rim holes, pattern of flange holes, number and location of lever arm apertures, height of clutch cover, and number and location of fins.

Furthermore, the fins 52 aid in the heat management of the clutch assembly 10. One problem with current clutch assemblies is the damage due to overheating of the assemblies. The heat produced by the spinning components of the engine may cause components to be damaged. For example, clutch discs are commonly warped after extended use due to the heat produced by the spinning components of the engine. Thus, the clutch disc must be replaced in order to provide efficient operation of the engine and vehicle. However, the fins 52 will work similar to a fan in bringing outside air to within the clutch cover 12 to aid in cooling of the clutch discs 28 and other components within the clutch assembly 10. The clutch assembly is always spinning. Thus, the spinning of the clutch cover 12 and fins 52 located on the clutch cover 12 will draw in air from outside the clutch cover 12 to aid in the cooling of the clutch disc 28. The cooling of the clutch disc 28 will extend the life of said clutch disc 28 and provide for prolonged efficiency of a vehicle engine. Therefore, it should be appreciated that the design of the fins 52 may vary.

As shown in the Figures, the fins 52 are generally bent segments 54 of the clutch cover 12 material bent outwardly from the axis 62 through the clutch cover 12. However, the fins 52 may be bent inwardly, or may be rotated 90° relative to the flange 42 to have different configurations to draw in more or less air for the clutch assembly 10. Thus, the present invention contemplates multiple designs of the fins 52 about the clutch cover 12.

Other alternative processes obvious to those in the field of the art are considered to be included in this invention. This description is merely an example of an embodiment and limitations of the invention are not limited to the application. For instance, the exact shape and size of the clutch cover 12 may be varied according to the amount of space available and the type of engine used with the clutch cover 12. Furthermore, the machines used to remove material from the clutch cover 12 may vary as well. A five axis laser cutter may be used to cut out the lever arm apertures in the clutch cover 12 body. A drill or other machine may be used to create the bolt holes or holes through the flange 42 and rim 44. Finally, a leveling machine or other machine capable of leveling the device may be used to level the flange 42 relative to the rim 44.

What is claimed is:

1. A method of forming a universal clutch cover for use with a clutch assembly used with virtually any make of a vehicle engine, the method comprising the steps of:
determining the make of the vehicle engine;
applying a force normal to a spinning sheet of metal having an aperture therethrough to form a generally bowl-shaped member with a flange at a wide end and a rim at a narrow end of the bowl-shaped member;
machining a pattern of holes in the flange of the bowl-shaped member, the pattern of holes corresponding to the make of the vehicle engine; and
machining a plurality of apertures through the bowl-shaped member between the flange and the rim thereby manufacturing the clutch cover.

2. The method of claim 1, further comprising the steps of:
enlarging the aperture of the bowl shaped member by cutting away a portion of said member; and
applying a force to the bowl shaped member to form a recessed ridge adjacent to the enlarged aperture opposite the flange.

3. The method of claim 2, wherein the step of applying a force to the bowl shaped member is performed by spinning the bowl shaped member while a force normal to a surface of the bowl shaped member is applied.

4. The method of claim 2, wherein the step of cutting a portion of the bowl shaped member away is performed using a laser cutter.

5. The method of claim 1 further comprising stamping a pattern of fins in the bowl-shaped member between each of the plurality of apertures.

6. The method of claim 5 wherein the fins are bent outwardly from the bowl-shaped member.

7. The method of claim 1 further comprising leveling the flange relative to a recessed ridge.

8. The method of claim 1 wherein the number of the plurality of apertures is between three and six apertures.

9. The method of claim 1 wherein a portion of the bowl-shaped member is generally perpendicular to the flange and rim.

10. The method of claim 1 further comprising centering the aperture in the sheet of metal before spinning the sheet along an axis of the aperture.

11. The method of claim 1 wherein the pattern of holes of the flange is stored in a database.

12. The method of claim 11 further comprising selecting the pattern of holes from the database based on the make of vehicle engine prior to machining the pattern in the flange.

13. The method of claim 1, wherein the step of applying a force normal to a spinning sheet of metal is performed by an internal spin process.

14. The method of claim 1, wherein the step of applying a force normal to a spinning sheet of metal is performed by an external spin process.

15. A method of forming a clutch cover for a clutch assembly of an engine, comprising:
forming a hole in a sheet of metal;

spinning the sheet of metal on a spin-casting machine about the central axis of the hole;

applying a force normal to the sheet of metal starting a predetermined distance from the edge of the hole to form a bowl-shaped member having a rim adjacent a narrow end and a flange adjacent a wide end, the rim and flange being generally perpendicular to the axis of the hole;

machining a pattern of flange holes in the flange, the pattern of flange holes configured to operably attach the clutch assembly to the engine; and cutting a plurality of apertures in the bowl-shaped member, the apertures adapted to house release levers thereby manufacturing the clutch cover.

16. The method of claim 15 further comprising stamping a plurality of fins around the bowl-shaped member.

17. The method of claim 15 further comprising machining a pattern of rim holes in the rim, the pattern of rim holes corresponding to the engine.

18. The method of claim 15 further comprising leveling the flange relative to the rim.

19. The method of claim 15, wherein the step of applying a force normal to the sheet of metal is performed by an internal spin process.

20. The method of claim 15, wherein the step of applying a force normal to the sheet of metal is performed by an external spin process.

21. A method of forming a customized clutch cover for use with a clutch assembly used with virtually any make of a vehicle engine, the method comprising the steps of:

receiving information identifying a particular make of engine;

receiving from a database, a pattern of holes corresponding to the identified engine;

applying a force normal to a spinning sheet of metal having an aperture therethrough to form a generally bowl-shaped member with a flange at a wide end and a rim at a narrow end of the bowl-shaped member;

enlarging the aperture of the bowl shaped member by cutting away a portion of said member;

applying a force to the bowl shaped member to form a recessed ridge adjacent to the enlarged aperture opposite the flange;

machining a pattern of holes in the flange of the bowl-shaped member, the pattern of holes corresponding to pattern of holes received from the database;

machining a plurality of apertures through the bowl-shaped member between the flange and the rim; and stamping a pattern of fins in the bowl-shaped member between each of the plurality of apertures thereby manufacturing the clutch cover.

* * * * *